March 1, 1966 E. SCHOPPE, JR., ETAL 3,237,858
FLUID LOGIC BI-DIRECTIONAL BINARY COUNTER DEVICE
Filed June 24, 1964 3 Sheets-Sheet 1
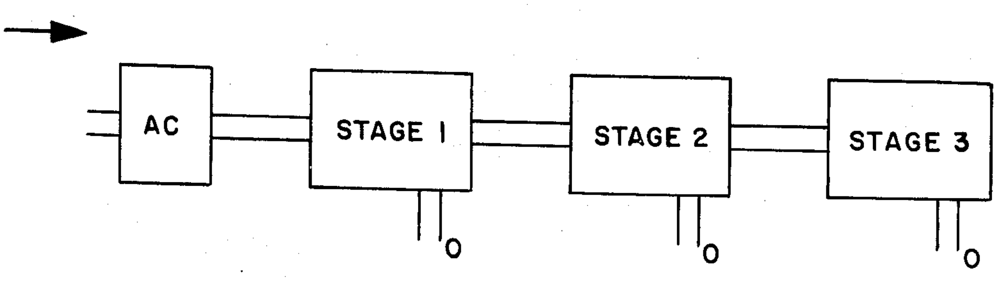
FIG. I
LEAST SIGNIFICANT DIGIT
| PULSE NO. | | 4 | 2 | 1 |
|---|---|---|---|---|
| 0 | | 0 | 0 | 0 |
| 1 | | 0 | 0 | 1 |
| 2 | | 0 | 1 | 0 |
| 3 | | 0 | 1 | 1 |
| 4 | | 1 | 0 | 0 |
| 5 | | 1 | 0 | 1 |
| 6 | | 1 | 1 | 0 |
| 7 | | 1 | 1 | 1 |
STANDARD BINARY
| 1 | 2 | 4 | | PULSE NO. |
|---|---|---|---|---|
| 0 | 0 | 0 | | 0 |
| 1 | 0 | 0 | | 1 |
| 0 | 1 | 0 | | 2 |
| 1 | 1 | 0 | | 3 |
| 0 | 0 | 1 | | 4 |
| 1 | 0 | 1 | | 5 |
| 0 | 1 | 1 | | 6 |
| 1 | 1 | 1 | | 7 |
ACCORDING TO DRAWING LEFT TO RIGHT
FIG. III
INVENTOR.
EDWARD SCHOPPE, JR.
CAVAS M. GOBHAI
BY Lawrence H. Poston
AGENT

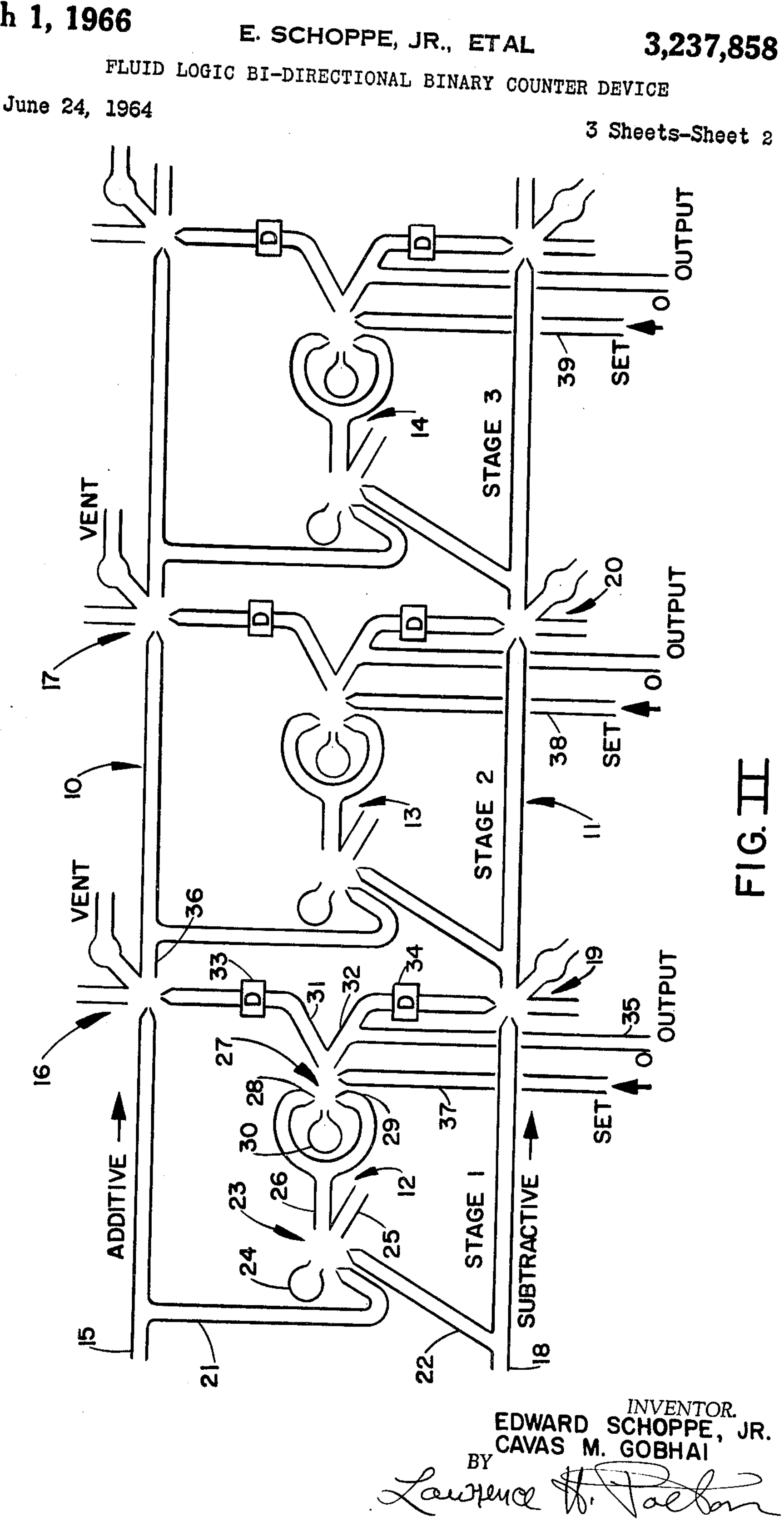
FIG. II
INVENTOR.
EDWARD SCHOPPE, JR.
CAVAS M. GOBHAI
BY Lawrence H. Patton
AGENT

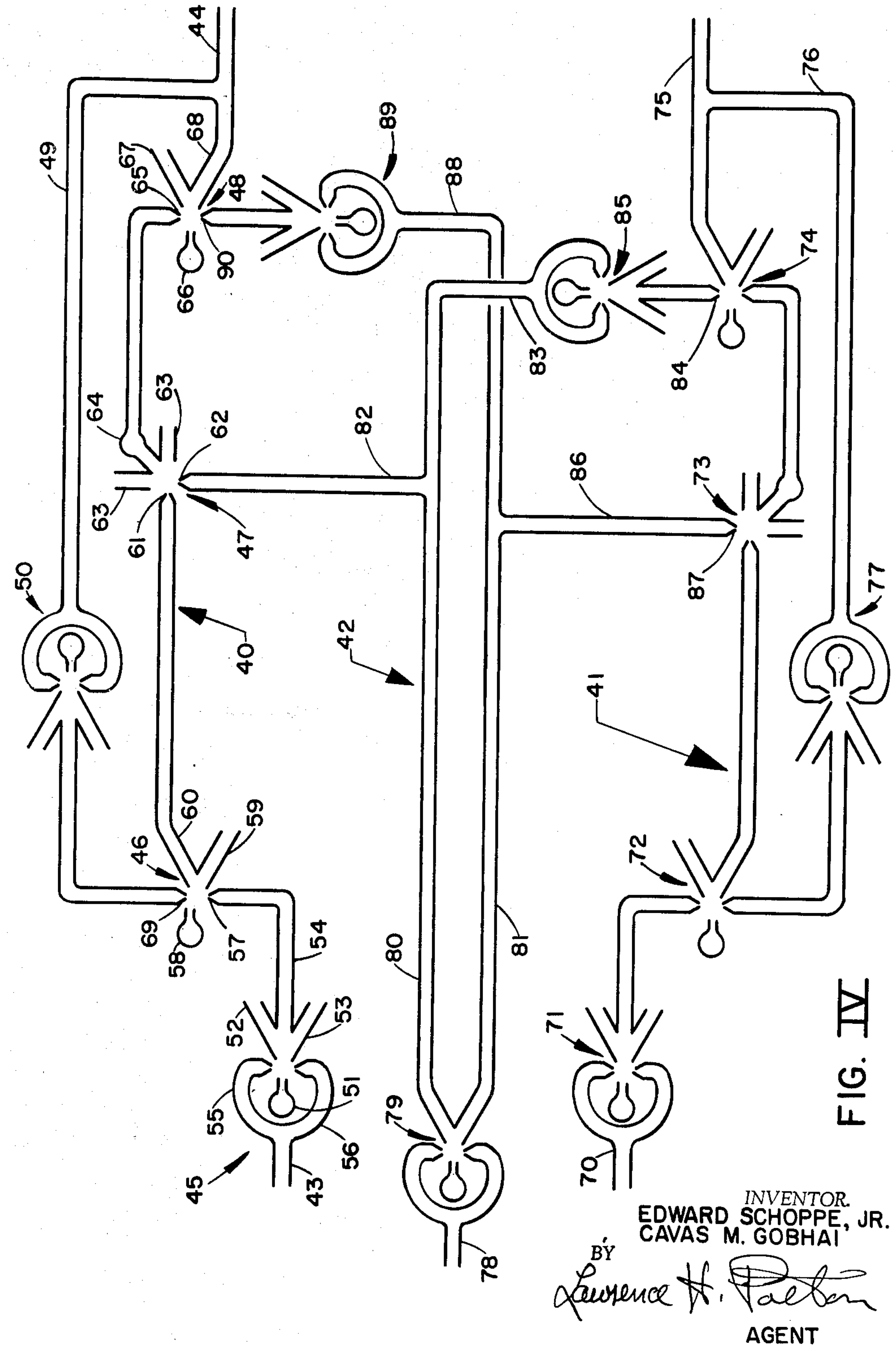
FIG. IV
INVENTOR.
EDWARD SCHOPPE, JR.
CAVAS M. GOBHAI
BY Laurence H. Patton
AGENT

United States Patent Office 3,237,858

Patented Mar. 1, 1966

3,237,858

FLUID LOGIC BI-DIRECTIONAL BINARY COUNTER DEVICE

Edward Schoppe, Jr., Walpole, and Cavas M. Gobhai, Cambridge, Mass., assignors to The Foxboro Company, Foxboro, Mass., a corporation of Massachusetts Filed June 24, 1964, Ser. No. 377,579
1 Claim. (Cl. 235—201)

This invention provides fluid logic devices and in particular dynamic, continuously flowing devices.

It particularly provides bi-directional binary counter means wherein two different series of fluid signal pulses may be applied to the device with a readout in binary terms.

As a specific illustration, this invention provides a fluid logic flip-flop unit which is operated on oscillator basis from a single source of a series of pulses derived from two different input series, one for adding and one for subtracting. These two input series are put through an "or" gate to actuate the oscillator flip-flop and there are "and" gates in the output of the flip-flop for determining whether a signal is to travel to a following stage or not.

This invention therefore provides a new and useful binary counter device based on fluid logic bi-directional means.

Other objects and advantages of this invention will be in part apparent and in part pointed out hereinafter and in the accompanying drawings, wherein:

FIGURE I is a block diagram of a series of stages of the device according to this invention;

FIGURE II is a schematic showing of a three-stage bi-directional counter according to this invention;

FIGURE III is a binary table in terms of a pulse series applied to the device of FIGURE II; and FIGURE IV is a schematic showing of one form of an anti-coincidence device for the input to this system as indicated by block AC in FIGURE I.

In the showing of FIGURES I and II the fluid flow is from left to right in the drawing. In FIGURE I the general schematic showing is, in series of left to right, an anti-coincidence unit followed by stages 1, 2 and 3 of the counter device. There may be any number of stages as desired.

In the FIGURE I showing and in FIGURE II as well, there are two main flow systems into and through the stages. Each stage is provided with a single output which will be zero or one, according to its situation on a binary basis. Reading of the three outputs of the three stages shown provides a three-digit binary number.

In the showing of this device the least significant digit stage is shown at the left, for example, stage one in FIGURE I.

Note that in FIGURE III, according to pulse numbers 1, 2, 3, etc. as serially applied as inputs, the FIGURE III chart shows a standard binary coding with the least significant digit at the right. To relate with the showing of the drawing, this coding is also shown reversed so that the least significant digit is at the left. Thus the operation of the device of the FIGURE II is more directly related.

In the FIGURE II showing of the device according to this invention, the two main flow systems are shown one at the top as at 10, and one at the bottom as at 11. An intermediate operating system, also parallel, is shown as an arrangement of series groupings each with an "or" gate followed by an oscillator flip-flop. This intermediate combination unit is indicated at stage one at 12, stage two at 13, and stage three at 14.

The upper fluid system 10 comprises an input 15 wherein an additive train of pulses is applied. This train of pulses is applied first to an "and" gate 16 and then, if proper, to an "and" gate 17 in the second stage.

In similar fashion in the lower fluid system 11 there is an input at 18 for a pulse train on a subtractive basis, which is applied first to an "and" gate 19 in the first stage, and then, if proper, to an "and" gate 20 in the second stage.

Each of the inputs 15 and 18 have branches therefrom as at 21 and 22 which are inputs to the first stage "or" gate 23. The "or" gate 23 has a power source 24 and a no signal vent 25. Upon the application of the pulse in either the inputs 21 or 22 through the "or" gate 23 there will be an output from the "or" gate in an operating output passage 26.

The output 26 of the "or" gate 23 is a single source from which a pair of opposing controls is provided for the first stage flip-flop 27. The control inputs are indicated at 28 and 29. The flip-flop unit 27 has a power source at 30 and two outputs, at 31 and 32.

As a train of pulses is provided in the output 26 of the "or" gate 23 the pulses will in turn go to the input control inputs 28 and 29 in accordance with the high and low pressures created by a particular situation of flip-flop 27. The feedback tendency through the control passages 28 and 29 causes counter-clockwise flow to tend to equalize these pressures. When the next pulse comes along from the passage 26 it will follow that circular form of flow to the new control input. That is, if the first pulse goes to control 28 there will be a counter-clockwise feedback which will pick up the second pulse and take it to control 29. Thus there is a constant oscillation of control from a single series of pulses 26.

The input of the "or" gate 23 receives pulses applied to either main system 10 or 11. In either case the pulse will operate the "or" gate 26. Pulse coincidence between the two systems is prevented, as indicated in FIGURE I, by a structure shown herein in FIGURE IV as an illustration of an anti-coincidence unit.

In stage one, the flip-flop outputs 31 and 32 lead to their respective "and" gates at 16 and 19 through delay units as at 33 and 34.

From a selected one of the output passages of the flip-flop 23 in stage one, in this case output 32, there is a branch 35 as a readout output to provide binary indication of the situation of the flip-flop 23 as either zero or one.

It is zero if there is no flow in the output passage 32. This means that there is flow in the output passage 31. It is one if there is a flow in the output passage 32 which conversely means there is no flow in the output passage 31.

In this respect the stage one flip-flop output passage 32 is both a stage coupling output and a readout output. The passage 31 is a stage coupling output.

The "and" gates 16 and 19 operate in open fashion if there is a signal in the input from the respective input source such as 15 or 18 without there being a signal specifically in "and" gate 16. Thus if there is a signal in the input 15 but no signal in the flip-flop output 31, the input signal will continue through "and" gate 16 to an output 36, as an input signal to the second stage. If there is a signal in stage one flip-flop output 31 but not in the input 15 it will be vented through the "and" gate. In the event there are signals both in the input 15 and in the flip-flop output 31 the "and" gate 16 will provide a common output to a common vent.

Similar operation occurs with respect to the stage one "and" gate 19.

In like manner the structures of stages two and three are coupled and arranged so as to operate according to the description of stage one above.

Referring to the FIGURE III chart with the least significant digit on the left as in FIGURE II, and considering pulse four, stage one output as zero, stage two is zero, and stage three is one.

Assume that a pulse is to be added there is an input in system 10 input 15. The input to stage one flip-flop 23 changes the output from passage 31 to passage 32. This makes stage one output "one," as may be seen in the pulse five FIGURE III situation. Since there was a signal in passage 31, stage one, there can be no coupling to stage two through the "and" gate 16. The signal from the input 15 and the signal from the flip-flop at 31 meet and proceed to the common vent. This being the case there is no input to the second stage "or" gate and the second stage output remains zero. There being no action in the second stage there can be no action in the third stage and therefore that remains the same, that is to say, one. In this manner, one pulse has been added to the situation of FIGURE III pulse four. Where the output was zero, zero, one, it now becomes one, zero, one.

It will be seen in like manner that considering pulse four as zero, zero, one, and subtracting a pulse by applying a pulse to the system 11, input 18, the pulse three situation of one, one, zero is achieved.

The delay devices as in stage one, 33 and 34, and in the other stages, are provided so that when a change is made the new pulse effect will take a little time to get to the "and" gate and prepare it for the following pulse. Thus an operating pulse does not interfere with itself.

It may be noted that stage one always changes state whenever a pulse is applied to it. The flip-flop unit 27 operates back and forth upon successive pulses whether they be additive or subtractive. Thus the least significant digit constantly changes, zero to one, and back to one. The further stages, two and three, and others if desired, will operate as permitted by the "and" gates 16, 17, 19 and 20 according to the previous signal and whether or not changes in the other digits are called for according to the binary coding.

In order to start from a pre-determined situation set control passages are provided, one in each stage. See 37 in stage one, 38 in stage two, and 39 in stage three. These are established so that prior to operation each of the stages may be set to zero by putting the flip-flop output into the upper leg of the output comparable to 31 in stage one. In each case, this will result in a starting point of zero pulses and output zero, zero, zero, binary indication.

Pulses in the subtractive input of system as at 18 will proceed in like manner to that described for the additive system 10, and the subtractive results will be a down grading on the binary coding. Starting with pulse four as a median it will be seen that to add a pulse will provide form zero, zero, one, an output of one, zero, one, and to subtract the pulse will provide from zero, zero, one, an output of one, one, zero.

The final stage three of the device is provided only with the input to the "or" gate and the oscillator flip-flop has a vented output and a readout output without any of the further stage coupling devices. If it is desired to have a stage four then stage three would be identical with stages one and two.

In the FIGURE IV anti-coincidence device, the pulse train systems and the time oscillator system are illustrated as operating from left to right. One pulse train is indicated at 40, at the top of the drawing, and the other is indicated generally at 41, at the bottom of the drawing. The timing oscillator system is indicated generally at 42, between the pulse train systems 40 and 41. The pulse train system 40 has an input passage therefor at 43, an output passage at 44. This system 40 consists of a series arrangement of a differentiator 45, a flip-flop unit 46, an "and" gate 47, and a flip-flop 48. From the output 44 there is a feedback passage 49 leading back to the first flip-flop 46, through a differentiator 50.

The input differentiator 45 is provided with a power source at 51. It is generally in the form of a flip-flop unit, with the ordinary flip-flop outputs 52 and 53 used only as vents. Between the outputs 52 and 53 there is a central output 54 through which the pulse train continues into the flip-flop unit 46. The differentiator is operated by means of two curved passages 55 and 56 which are essentially uniform in shape. Both stem from the input passage 43. These passages 55 and 56 act as opposing control inputs for the differentiator 45.

By the nature of the formation of the differentiator or by a lateral starting set signal (not shown) it may be considered that the first pulse of the pulse train in the input 43 might use one or the other of the passages 55 and 56. Assuming it to be the passage 55, this first pulse would operate the differentiator to flip the output from the output vent 52 to the output vent 53. In so doing, a pulse would be generated in the common output 54, representative of the controlling pulse which is operating the flip-flop device.

At this stage of the operation of the differentiator 45, by the nature of the fluid logic flip-flop, there will be a relatively high pressure at the control input of the passage 55 and a relatively low pressure at the control input of the passage 56. Because of this difference in pressure, after the first pulse arrives in the differentiator 45, there is a tendency to equalization of pressure back through the passage 55, and then forward through the passage 56. This tendency sets up a small stream in this counter-clockwise direction.

Accordingly, when the second pulse comes along in the input 43, it will encounter this counter-clockwise flow and will follow it so as to apply the second pulse to the control input 56. This action flips the output in passage 53 to the output passage 52, and in passing provides an output pulse in the common central passage 54.

The input frequency is thus duplicated in the output passage 54 of the differentiator 45. The purpose of this action is to provide a sharp pulse input to the flip-flop 46. If the input train is formed of step signals, they will be translated into pulses for the suitable operation of the flip-flop 46.

The pulse train, in the form of sharp pulses, now appears in the passage 54 and is applied to the flip-flop 46 at the control input 57. The flip-flop 46 is provided with a power source 58 and has a vented output 59 and an operating output 60.

The normal inactive situation of the flip-flop 46 is with the output in the vent passage 59. When there is a pulse in the control input 57, the flip-flop 46 has its output moved to the output passage 60 and this output continues, to provide a control input 61 to the "and" gate 47.

The "and" gate 47 has another control input 62, from the timing oscillator system 42. If there is no signal in the timing input 62 then a pulse in the input 61 will pass through the "and" gate and vent by means of passage 63. Similarly, a timing signal in the control input 62 occurring without a pulse in the input 61 will be vented to output 63.

In the event of simultaneous occurrence of signals in the "and" gate 47 both at 61 and 62, the signals will encounter each other within the "and" gate, mutually deflect each other, and exit through the "and" gate output at 64 as a signal representative of one pulse in the pulse train system 40. The signal in the output passage 64 of the "and" gate 47 is applied to the flip-flop unit 48 as a control input at 65. The flip-flop 48 has a power source at 66, a vent output 67, and an operating output 68. The flip-flop unit 48 is normally established with the output venting through passage 67. When a signal appears in the control input 65, the output is flipped over to the operating output passage 68 as an output signal for the pulse train system 40, by way of output passage 44.

Simultaneously with this action a signal is fed back through passage 49, and through differentiator 50, to a control feedback input 69 to the flip-flop 46. This action flips the signal therein back to the output vent passage 59 to reset this device and cut off the output signal of that system.

The differentiator 50 is structurally identical with the differentiator 45 in the input. It operates in the same manner, so that anything in the form of a step signal will be reduced to a pulse. A pulse will simply be transmitted as a duplicated pulse. Thus whatever controlling signals are applied to the flip-flop 46 in the feedback control input 69 are in the form of simple, short, sharp control pulses.

The pulse train system 41, shown at the bottom of the drawing, is a duplication of the system 40 described above and operates identically with respect thereto.

Thus the pulse train system 41 comprises a series arrangement of an input passage 70, a differentiator 71, a flip-flop unit 72, an "and" gate 73, and a final flip-flop unit 74, leading to an output passage 75. There is also a feedback passage 76 from the output passage 75, through a differentiator 77 to the flip-flop unit 72.

The timing oscillator system 42 comprises an input passage 78 to a timing oscillator. This is identical with and operates in the same way as the differentiator 45 of the pulse train system 40, except that the timing oscillator has no central common output, and both of its ordinary flip-flop outputs are used.

The two outputs of the timing oscillator are at 80 and 81. From the passage 80 there is a side passage 82 leading to the "and" gate 47 of the pulse train system 40, by way of the control input 62. Also from the timing oscillator output 80, there is an output passage 83 leading to the pulse train system 41, specifically the terminal flip-flop unit 74, as a control input 84. The passage 83 includes a differentiator 85 which provides a pulse output like that of the differentiator 45 in system 40, for the purpose of providing suitable operating signals for the flip-flop unit 74.

Similarly, from the timing oscillator output 81 there are lateral passages with one at 86, to the pulse train system 41, as a control input at 87, to the "and" gate 73. There is also a lateral passage at 88, through a differentiator 89, to the terminal flip-flop 48 of the pulse train system 40, by way of an input control passage at 90.

It will be seen when the timing oscillator provides a step signal in the output 80, it simultaneously activates the pulse train system 40 "and" gate 47, and resets the pulse train system 41 flip-flop 74.

In similar fashion, an output signal in the timing oscillator passage 81, simultaneously activates the pulse train system 41 "and" gate 73, and resets the pulse train system 40 terminal flip-flop 48.

In the operation of this device, the timing oscillator is established so that it operates, for example, first in system 40, and then in system 41, in a regular, scanner-like procedure. It looks first to the system 40, to see if there are any pulses going through, or ready to go through. If so, it lets them through, meanwhile holding back pulses in system 41. The reverse is accomplished by way of a signal in the timing oscillator output 81.

If the timing oscillator is in the actuation stage with respect to the system 40, then an input pulse will proceed through the flip-flop 46 and through the "and" gate 47 because of the simultaneous appearance of signals at 61 and 62. It will then operate the flip-flop 48 to provide the output in the passage 44, and the feedback in the passage 49 to reset the initial flip-flop 46. The result is a single output pulse in passage 44.

While this is going on, if there is a coincident pulse in the pulse train system 41 it will reach the "and" gate 73, but will not pass through, except to vent, because there will be no signal in the input passage 87.

When the timing oscillator reverses, and actuates the system 41, the signal which is waiting at the gate 63 will be allowed to pass through. Similar holding action is effective with respect to the gate 47 and the pulse train system 40, when a signal arrives there during the time when the timing oscillator is activating the system 41.

Thus in case of a pulse in one system coincident with a pulse in the other system, according to the timing of the oscillator 79, one of these pulses will be held back long enough for the other to go through.

It is preferable in this situation that the frequency of the timing oscillator be such that one cycle comprises a positive operation of the system 40 plus a positive operation of the system 41. The frequency of the pulses in either system will be not more than one such pulse to such a cycle of the timing oscillator.

With the system according to this invention, none of the pulses are lost. There simply is a delay of one when there is a coincidence of two.

This invention therefore provides a new and useful fluid logic arithmetic device in the form of binary bi-directional counter operating on a dynamic fluid continuous flow basis.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

We claim:

A fluid logic bi-directional binary counter made up of several stages, said counter comprising three parallel fluid systems, each of the outer systems comprising a series of "and" gates, whereby each of said stages includes one of said "and" gates in each of said outer systems, input means for supplying fluid pulses to be added to one of said outer systems, input means for supplying fluid pulses to be subtracted to the other outer system, each stage of the central system of said three parallel systems comprising the combination of an "or" gate and a fluid oscillator flip-flop, an input from each of said outer systems to each of said stages, from a point prior to said "and" gates of said stage to the "or" gate of said stage as a control therefor, one of the outputs of said "or" gate providing the input for said oscillator flip-flop, one of the outputs of said oscillator flip-flop providing a control signal for one outer system "and" gate of said stage, the other of the outputs of said oscillator flip-flop providing a control signal for the other outer system "and" gate of said stage, and a binary readout from one output of said oscillator flip-flop.

References Cited by the Examiner

UNITED STATES PATENTS 3,001,698 9/1961 Warren ------------ 235—201

OTHER REFERENCES

Gray, et al.: "Fluid Amplifiers," Control Engineering, February 1964, pages 57–64.

Mitchell, et al.: "Fluid Logic Devices and Circuits," Transactions of the Society of Instrument Technology. Pages 1–15, Feb. 26, 1963.

General Electric Company, "Fluid Amplifier State of the Art," vol. 1, Advanced Technical Laboratories, Schenectady, N.Y., Dec. 3, 1963, pages 6–12 to 6–18 and 7–10 to 7–11 relied on.

Fluid Amplification Symposium, Diamond Ordnance Fuze Laboratories, Ordnance Corp., Dept. of the Army, October 1962, pages 443–447 relied on.

LEO SMILOW, *Primary Examiner.*

W. F. BAUER, *Assistant Examiner.*